US012580787B2

(12) United States Patent
Ovadia et al.

(10) Patent No.: US 12,580,787 B2
(45) Date of Patent: Mar. 17, 2026

(54) IMPLEMENTING CABLE MODEMS IN SINGLE ACCESS DEVICE BY REGISTERING MODEM SOFTWARE STACK (MSS) WITH REGISTRATION SERVER USING MEDIA ACCESS CONTROL (MAC) ADDRESS

(71) Applicant: Charter Communications Operating, LLC, St. Louis, MO (US)

(72) Inventors: Shlomo Ovadia, Denver, CO (US); Deependra Singh Rawat, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 246 days.

(21) Appl. No.: 18/417,586

(22) Filed: Jan. 19, 2024

(65) Prior Publication Data

US 2025/0240182 A1 Jul. 24, 2025

(51) Int. Cl.
H04L 12/28 (2006.01)

(52) U.S. Cl.
CPC ............................... H04L 12/2801 (2013.01)

(58) Field of Classification Search
CPC .. H04L 12/2801; H04L 12/28; H04L 12/4625
See application file for complete search history.

(56) References Cited

U.S. PATENT DOCUMENTS

| | | | | | |
|---|---|---|---|---|---|
| 5,210,748 A | * | 5/1993 | Onishi | ............... | H04L 12/4625 |
| | | | | | 370/405 |
| 5,724,356 A | * | 3/1998 | Parameswaran Nair | .................... | |
| | | | | | H04M 11/06 |
| | | | | | 370/402 |
| 7,433,349 B2 | * | 10/2008 | Liu | ......................... | H04L 45/00 |
| | | | | | 725/111 |
| 12,184,473 B2 | * | 12/2024 | Ovadia | ................. | H04L 41/149 |

* cited by examiner

*Primary Examiner* — Tammara R Peyton
(74) *Attorney, Agent, or Firm* — Dority & Manning, P.A.

(57) ABSTRACT

A method includes initiating, by a first system-on-chip (SoC) of an access device, a first modem software stack (MSS) operable to communicate with a registration server and operable to communicate with a first local area network (LAN) port of the access device. The method includes initiating, by a second SoC of the access device, a second MSS operable to communicate with the registration server and operable to communicate with a second LAN port of the access device. The method includes registering and provisioning the first MSS as a first modem with the registration server using a first media access control (MAC) address. The method includes registering and provisioning the second MSS as a second modem with the registration server using a second MAC address.

20 Claims, 4 Drawing Sheets

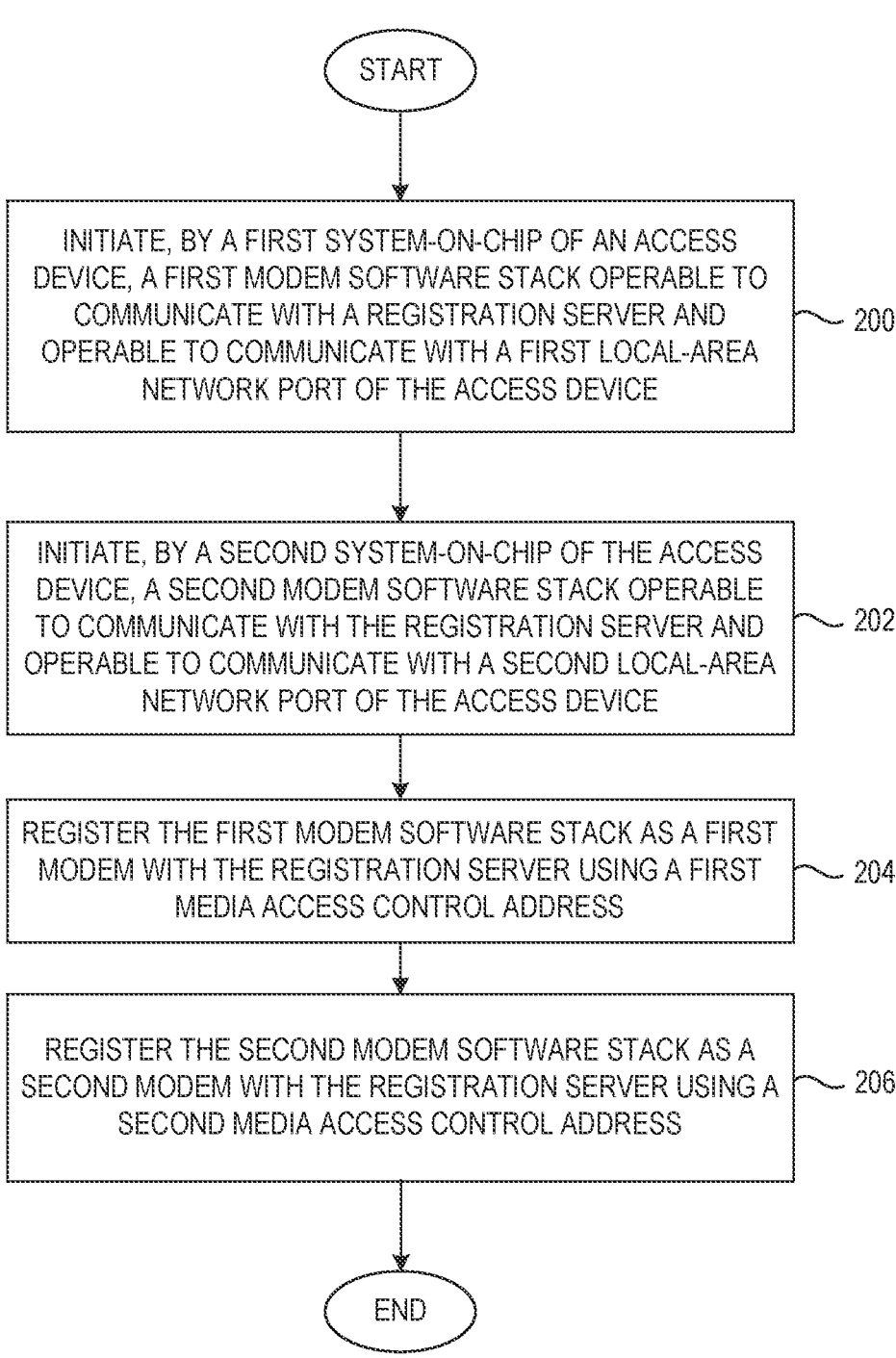

START

INITIATE, BY A FIRST SYSTEM-ON-CHIP OF AN ACCESS DEVICE, A FIRST MODEM SOFTWARE STACK OPERABLE TO COMMUNICATE WITH A REGISTRATION SERVER AND OPERABLE TO COMMUNICATE WITH A FIRST LOCAL-AREA NETWORK PORT OF THE ACCESS DEVICE ~ 200

INITIATE, BY A SECOND SYSTEM-ON-CHIP OF THE ACCESS DEVICE, A SECOND MODEM SOFTWARE STACK OPERABLE TO COMMUNICATE WITH THE REGISTRATION SERVER AND OPERABLE TO COMMUNICATE WITH A SECOND LOCAL-AREA NETWORK PORT OF THE ACCESS DEVICE ~ 202

REGISTER THE FIRST MODEM SOFTWARE STACK AS A FIRST MODEM WITH THE REGISTRATION SERVER USING A FIRST MEDIA ACCESS CONTROL ADDRESS ~ 204

REGISTER THE SECOND MODEM SOFTWARE STACK AS A SECOND MODEM WITH THE REGISTRATION SERVER USING A SECOND MEDIA ACCESS CONTROL ADDRESS ~ 206

END

*FIG. 2*

IMPLEMENTING CABLE MODEMS IN SINGLE ACCESS DEVICE BY REGISTERING MODEM SOFTWARE STACK (MSS) WITH REGISTRATION SERVER USING MEDIA ACCESS CONTROL (MAC) ADDRESS

BACKGROUND

A subscriber that obtains network access and content from a service provider can receive subscribed services through a customer premises equipment (CPE), such as a cable modem or optical network unit, sometimes referred to as an access device, on the customer's premises. The access device can communicate with remote computing systems that are located offsite of the customer's premises to provide services to the customer.

SUMMARY

The embodiments disclosed herein implement multiple cable modems in a single access device.

In one implementation, a method is provided. The method includes initiating, by a first system-on-chip (SoC) of an access device, a first modem software stack (MSS) operable to communicate with a registration server and operable to communicate with a first local area network (LAN) port of the access device. The method includes initiating, by a second SoC of the access device, a second MSS operable to communicate with the registration server and operable to communicate with a second LAN port of the access device. The method includes registering the first MSS as a first modem with the registration server using a first media access control (MAC) address. The method includes registering the second MSS as a second modem with the registration server using a second MAC address.

In another implementation, a computing device is provided. The computing device includes a memory, and a processor device coupled to the memory. The processor device is operable to initiate, by a first Soc of an access device, a first MSS operable to communicate with a registration server and operable to communicate with a first LAN port of the access device. The processor device is further operable to initiate, by a second SoC of the access device, a second MSS operable to communicate with the registration server and operable to communicate with a second LAN port of the access device. The processor device is further operable to register the first MSS as a first modem with the registration server using a first MAC address. The processor device is further operable to register the second MSS as a second modem with the registration server using a second MAC address.

In another implementation, a non-transitory computer-readable storage medium is provided. The non-transitory computer-readable storage medium includes executable instructions to cause a processor device to initiate, by a first SoC of an access device, a first MSS operable to communicate with a registration server and operable to communicate with a first LAN port of the access device. The instructions further cause the processor device to initiate, by a second SoC of the access device, a second MSS operable to communicate with the registration server and operable to communicate with a second LAN port of the access device. The instructions further cause the processor device to register the first MSS as a first modem with the registration server using a first MAC address. The instructions further cause the processor device to register the second MSS as a second modem with the registration server using a second MAC address.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a flowchart of a method for initializing an access device having a first MSS and a second MSS according to some embodiments;

DETAILED DESCRIPTION

Figure 1:
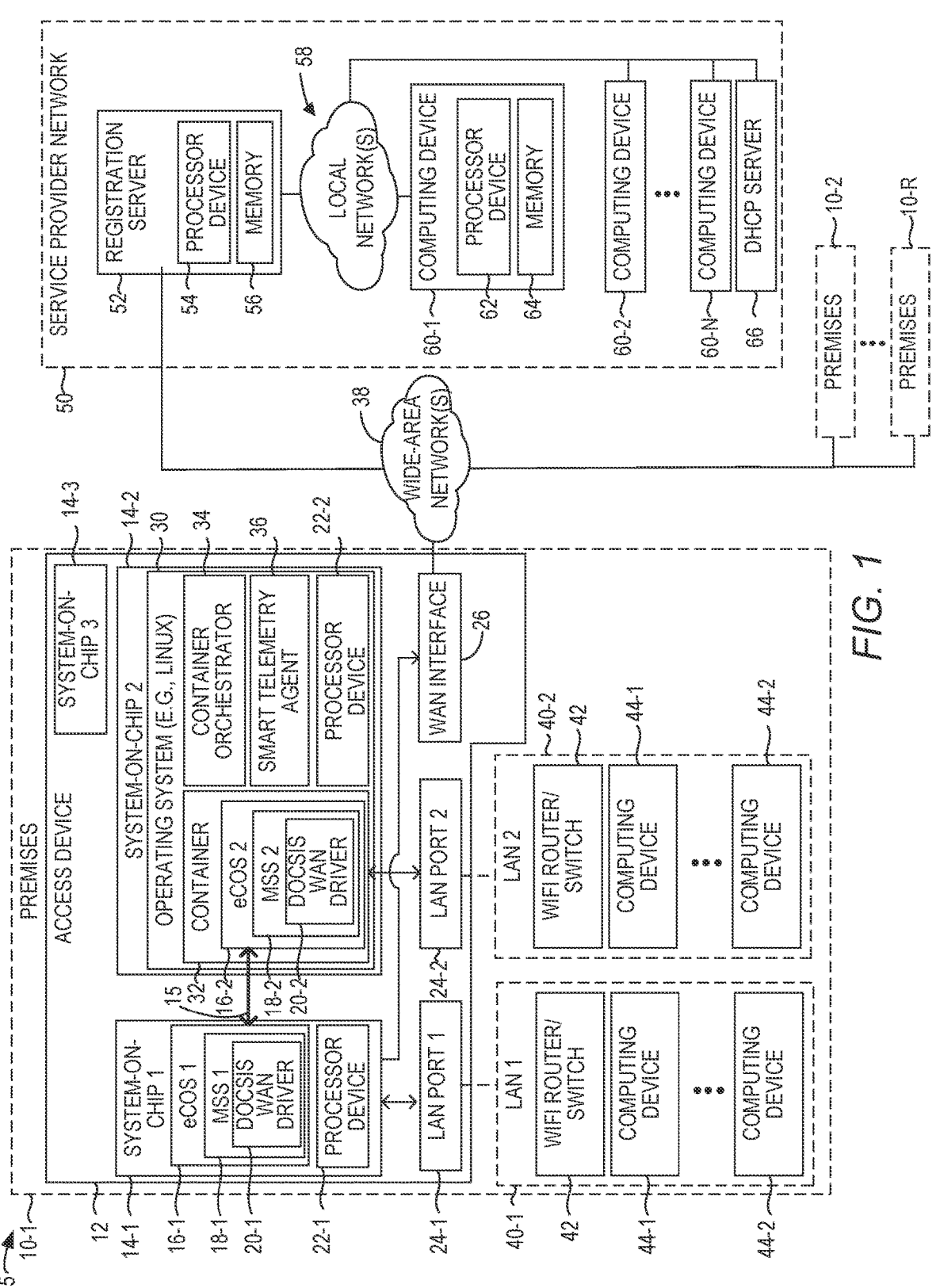
FIG. 1 is a block diagram of an environment including an access device having a first modem software stack (MSS) and a second MSS according to some embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A subscriber that obtains network access or other services (e.g., cable services) from a service provider can receive the network access and/or other services through a customer premises equipment (CPE), referred to herein as an access device, on the customer's premises. The access device can include a processor device, a wide-area network (WAN)

interface to allow the access device to communicate over coaxial data lines and register itself with a registration server, and a local area network (LAN) port that provides for the access device to communicate with a router implementing a LAN for the customer.

A large service provider may support millions of customers, each of which may be provided an access device, such as a cable modem, by the service provider. In addition, a customer may desire to maintain multiple independent services on the customer's premises for various reasons, such as providing separate services for a customer's personal network and business network, providing separate (e.g., limited) services for a customer's children compared to the customer's own services, or for other reasons. Implementing multiple independent services (e.g., independent local area networks) conventionally requires the customer to have multiple access devices on the customer's premises. Furthermore, these multiple access devices are often fed through a single coaxial data line, thereby requiring a coaxial splitter to feed such access devices, which may limit performance of the services. The use of a splitter can contribute to decreased performance of the services implemented by the access devices, such as reduced upstream and/or downstream communication speeds, reduced availability of network time for each access device, and so on. Furthermore, this configuration can contribute to increased hardware costs for the service provider and the customer associated with multiple access devices, splitters, and other hardware.

The present disclosure provides a solution to these problems by providing an access device capable of implementing multiple modem software stacks. The access device includes a first system-on-chip (SoC) and a second SoC. The first SoC can implement a first modem software stack (MSS) operable to communicate with a registration server and operable to communicate with a first LAN port of the access device. Similarly, the second SoC can implement a second MSS operable to communicate with the registration server and a second local area network port of the access device. Each of the MSSs can be registered with the registration server under a unique media access control (MAC) address and/or communicate using a separate Internet Protocol (IPO address. Furthermore, because each MSS is implemented using a SoC, the MSSs can be independently provisioned within a common access device, such as a Data Over Cable Service Interface Specification (DOCSIS) 4.0 cable modem (sometimes referred to as a "D4.0 cable modem").

The present disclosure provides a number of technical effects and benefits, including improvements to computing technology. As one example, the present disclosure can provide improved upstream and/or downstream communication speeds using existing communications infrastructure by implementing multiple MSSs on a single access device, both of which can communicate over a single data line without requiring a coaxial splitter or similar performance-decreasing component. Furthermore, the present disclosure can provide reduced hardware costs associated with maintaining multiple MSSs on a customer premises.

FIG. 1 is a block diagram of an environment 5 suitable for implementing multiple cable modems in a single access device according to some embodiments. The environment 5 includes a customer premises 10-1. The customer premises 10-1 is associated with a customer. For example, the customer premises 10-1 may be a customer's home, a business, or other premises. The customer premises 10-1 can include an access device 12. The access device 12 can be a CPE device, such as a modem, such as a cable modem (e.g., a D4.0 cable modem).

The access device 12 can include at least a first SoC 14-1. The first SoC 14-1 can implement a first real-time operating system (RTOS) 16-1. The first RTOS can be any suitable RTOS, such as, in some implementations, an embedded configurable operating system (eCOS). The first SoC 14-1 can further implement a first MSS 18-1 in the first RTOS 16-1. The first MSS 18-1 can be, for example, a cable MSS (CMSS). The first SoC 14-1 can include one or more first processor device(s) 22-1 operable to implement the first RTOS 16-1 and the first MSS 18-1. For instance, in some implementations, the first SoC 14-1 and/or the first processor device(s) 22-1 can be any suitable processor device, such as, for example, a dual-core processor device. One example first SoC 14-1 is implemented using a VIPER processor device. The VIPER processor device can be configured to run a custom eCOS as the RTOS 16-1. The eCOS 16-1 may include a Board Support Package (BSP), which is a layer of software containing hardware-specific boot firmware, device drivers, and other routines that facilitates the execution of the eCOS 16-1 on the access device 12.

The first SoC 14-1 can be operable to communicate with a first LAN port 24-1 of the access device 12. The first LAN port 24-1 can provide access to a first LAN 40-1 for the first MSS 18-1. The first LAN 40-1 can include a Wi-Fi router or switch 42 operable to connect one or more computing devices 44-1 . . . 44-M in the LAN 40-1. Each of the computing devices 44-1 . . . 44-M can receive network services or other services from a service provider through the first MSS 18-1. A first MAC address can be associated with the first MSS 18-1 and the first SoC 14-1.

In addition, the access device 12 can include a second SoC 14-2. The second SoC 14-2 can implement a second RTOS 16-2. The second RTOS can be any suitable RTOS such as, in some implementations, an eCOS. The second SoC 14-2 can further implement a second MSS 18-2 in the second RTOS 16-2. The second MSS 18-2 can be, for example, a CMSS. A second MAC address can be associated with the second MSS 18-2 and the second SoC 14-2. The second SoC 14-2 can include one or more second processor device(s) 22-2 operable to implement the second RTOS 16-2, the second MSS 18-2. For instance, in some implementations, the second SoC 14-2 and/or the second processor device(s) 22-2 can be any suitable processor device, such as, for example, a quad-core processor device. One example second SoC 14-2 is implemented using an ARM processor device. The ARM processor device may include one or more processor cores, such as four processor cores.

The second SoC 14-2 can be operable to communicate with a second LAN port 24-2 of the access device 12. The second LAN port 24-2 can provide access to a second LAN 40-2 for the second MSS 18-2. The second LAN 40-2 can include a Wi-Fi router or switch 42 operable to connect one or more computing devices 45-1 . . . 45-P in the LAN 40-2. Each of the computing devices 45-1 . . . 45-P can receive network services or other services from a service provider through the second MSS 18-2. In this manner, each MSS 18-1, 18-2 can implement different services such as, by way of non-limiting example, different bandwidth tiers. As another example, the first MSS 18-1 can provide voice and data services at a first speed tier while the second MSS 18-2 provides only data services at a second speed tier, which may be higher or lower than the first speed tier. As another example, the first MSS 18-1 can operate in a bridge mode, and the second MSS 18-2 can operate in a routing mode based on the subscribed services.

Each of the first SoC 14-1 and the second SoC 14-2 can provide access to one or more wide-area network(s) (WAN (s)) 38 through a WAN interface 26. The WAN(s) 38 may be or may include, for example, a hybrid fiber-coaxial network or distributed access architecture (DAA) network. In some implementations, due to hardware constraints or other reasons, only a single WAN interface 26 may be provided for the access device 12. For instance, in some implementations, the WAN interface 26 may be a coaxial interface operable to communicate over a coaxial data line. The WAN interface 26 may include RF front-end circuitry that does suitable demodulation on data received via the WAN 38, and suitable modulation for data sent by the SoC 14-1 and 14-2 over the WAN 38. In addition, the access device 12 may include diplexers, splitters, and combiners that enable the access device 12 to operate in different frequency plans as specified in the DOCSIS 4.0 PHY specification. These components are typically separate from the WAN interface 26. In addition, the access device 12 may include the RF front-end circuit for the first SoC 14-1 and for the second SoC 14-2. This RF front-end circuit demodulates the downstream DOCSIS signals for processing by the first SoC 14-1 and the second SoC 14-2, and modulates the upstream DOCSIS signals from the first SoC 14-1 and the second SoC 14-2 for transmission via the WAN interface 26.

Due to infrastructure limitations, only a single coaxial data line may service the premises 10-1. In these cases, the first SoC 14-1 may be directly coupled to the WAN interface 26 to facilitate communications over the WAN 38, but the second SoC 14-2 may not be directly coupled to the WAN interface 26.

Nonetheless, according to example aspects of the present disclosure, the first MSS 18-1 and the second MSS 18-2 can each communicate via the common WAN interface 26 of the access device 12. In particular, to communicate via the WAN interface 26, the second SoC 14-2 may first communicate with the first SoC 14-1. For instance, the second SoC 14-2 of the access device 12 can establish a communications bridge 15 with the first SoC 14-1. The communications bridge 15 can be operable to communicate messages between the first SoC 14-1 and/or the first MSS 18-1 and the second SoC 14-2 and/or the second MSS 18-2. The second MSS 18-2 can send a message to the first SoC 14-1 via the communications bridge 15 to be communicated by the first SoC 14-1 to remote systems via the WAN interface 26 over the WAN 38. The first SoC 14-1 may therefore forward messages from the second MSS 18-2 to remote systems via the WAN interface 26, which can provide for the second MSS 18-2 to operate as an independent modem even without direct access to the WAN interface 26 and the WAN 38.

In addition to the functionality provided by the second MSS 18-2, the second SoC 14-2 can be responsible for one or more other functions of the access device 12. For instance, the second SoC 14-2 can be responsible for telemetry services of the access device 12. Therefore, the second SoC 14-2 can in some implementations isolate the second RTOS 16-2 from the other functionality on the second SoC 14-2. For instance, in addition to the second RTOS 16-2, the second SoC 14-2 can initiate a third operating system (OS) 30 that is separate from the second RTOS 16-2. The third OS 30 can perform and execute programs, operations, and applications that are common to both the first MSS 16-1 and the second MSS 16-2 or associated with other functionality of the access device 12. As one example, the third OS 30 can initiate a smart telemetry agent 36 for streaming telemetry data. The smart telemetry agent 36 can be operable to obtain telemetry data associated with the first SoC 14-1 and to obtain telemetry data associated with the second SoC 14-2. Additionally or alternatively, the smart telemetry agent 36 can stream the telemetry data associated with the first SoC 14-1 and the telemetry data associated with the second SoC 14-2 to a server (e.g., through the communications bridge 15 and through the first SoC 14-1) via the WAN interface 26 of the access device 12. One example smart telemetry agent is the OpenWrt Collectd streaming telemetry agent. Such telemetry data may comprise any information that may be desirable to obtain, such as quantities of downstream and upstream data transfer over periods of time of the MSSs 18-1 and 18-2, error rates, real time temperatures of the SoCs 14-2 and 14-2, and the like. To separate the third OS 30 from the RTOS 16-2, one can be provisioned in an independent computing environment, such as a container or virtual machine. The second SoC 14-2 can provision one of the third OS 30 or the RTOS 16-2 using a software container such as Docker, LXC, etc. For instance, the second SoC 14-2 can initiate the second RTOS 16-2 in a first computing environment and initiate the third OS 30 in a second computing environment. The third OS 30 and the second RTOS 16-2 can be associated with respective partitions of the second processor device 22-2. For instance, each computing environment can be respectively associated with one or more processor cores of the second SoC 14-2 (e.g., the second processor device 22-2). The second SoC 14-2 can cause the first computing environment to be associated with a first processor core (or cores) of the second processor device 22-2 and/or cause the second computing environment to be associated with a second processor core (or cores) of the second processor device 22-2. As one example, the second SoC 14-2 includes a quad-core processor device 22-2 having two cores partitioned to the RTOS 16-2 and two cores partitioned to the third OS 30.

The second SoC 14-2 can further include a container orchestration service 34 to initiate the second RTOS 16-2 in a container 32 to isolate the RTOS 16-2 from the third OS 30. Example container orchestration services include, but are not limited to, Kubernetes, Docker, Docker Swarm, LXC, etc. Although FIG. 1 illustrates a container 32 and container orchestration service 34, it should be understood that aspects of the present disclosure contemplate alternative forms of independent computing environments, such as virtual machines, or any other suitable isolation technology.

The access device 12 (e.g., the first MSS 18-1 and the second MSS 18-2) can be operable to communicate with a registration server 52 of a service provider network 50. For instance, the access device 12 can communicate with the registration server 52 through the WAN interface 26 over the WAN 38. The first MSS 18-1 may be operable to register with the registration server 52 with a MAC address associated with the first MSS 18-1. In some implementations the MAC address of the first MSS 18-1 may be generated during the manufacture of the access device 12. The second MSS 18-2 may be operable to register with the registration server 52 with a MAC address associated with the second MSS 18-2. In some implementations the MAC address of the second MSS 18-2 may be generated by the MSS 18-2, or by the RTOS 16-2.

The registration server 52 can include a processor device 54 and a memory 56. The registration server 52 may be, for example, a cable modem termination system (CMTS), an integrated CMTS (I-CMTS), or virtual CMTS (vCMTS), which may depend on the cable plant architecture of the WAN(s) 38. The registration server 52 can perform registration of modems on the service provider network 50 such that various services can be provisioned to the modems on the service provider network 50. For instance, the first RTOS 16-1 can initiate a first DOCSIS driver 20-1 operable to communicate via a DOCSIS protocol with the registration server 52. The DOCSIS driver 20-1 can provision network services for the first SoC 14-1. In addition, the second RTOS 16-2 can initiate a second DOCSIS driver 20-2 operable to communicate via the DOCSIS protocol with the registration server 52. The RTOSs 16-1 and 16-2 can, by the DOCSIS drivers 20-1 and 20-2, execute DOCSIS protocol suites, such as, for example, PacketCable 1.5/2.0, with customization for vendor-specific extensions. The DOCSIS drivers 20-1, 20-2 are treated as if they are associated with separate access devices from the perspective of the registration server 52 because their respective MSSs 18-1, 18-2 are associated with distinct MAC addresses.

In addition, in some implementations, the access device 12 can include a third SoC 14-3. The third SoC 14-3 can be a dedicated security processor. The third SoC 14-3 can provide functionality associated with security of the access device 12, such as DOCSIS protocol security features (e.g., associated with the first DOCSIS driver 20-1 and/or the second DOCSIS driver 20-2), Baseline Privacy Interface Plus V2 (BPI+V2), authentication, encryption, secure boot, etc.

In addition to the registration server 52, the service provider network 50 can communicate with one or more computing devices 60-1, 60-2, . . . 60-N each including a processor device 62 and memory 64 over one or more local networks 58. The computing devices 60-1 . . . 60-N can be associated with a service provider, and may comprise, by way of non-limiting example, an Automatic Configuration Server (ACS), a Time of Day (ToD) server, a Trivial File Transfer Protocol (TFTP) server, an SNMP server, a Speed Test server, and the like. Furthermore, a dynamic host configuration protocol (DHCP) server 66 can provide IP addresses for components, including the first MSS 16-1 and the second MSS 16-2.

Although only one premises 10-1 is illustrated in detail in FIG. 1 for simplicity, the registration server 52 can register access devices associated with other premises 10-2 . . . 10-R as modems as described above. Some or all of the other premises 10-2 . . . 10-R may include access devices having two independent MSSs, as described herein. Additionally or alternatively, some or all of the other premises 10-1 may include access devices having only one MSS.

The access device 12 can additionally include other processor devices or systems-on-chips (not illustrated) for the purposes of performing other functionality associated with the access device 12 and/or network provisioning. Such components are generally omitted for the purposes of concise illustration, but are not intended to be excluded from aspects of the present disclosure.

FIG. 2 is a flowchart of a method for initializing an access device having a first MSS and a second MSS according to some embodiments. FIG. 2 will be discussed in conjunction with FIG. 1. The method includes, at block 200, initiating, by the first SoC 14-1 of an access device 12, the first MSS 18-1. The first MSS 18-1 can be operable to communicate with the registration server 52 and/or operable to communicate with the first LAN port 24-1 of the access device 12. The first SoC 14-1 can initiate the first RTOS 16-1 implementing the first MSS 18-1. Additionally, the first RTOS 16-1 can initiate the first DOCSIS driver 20-1 operable to communicate via a DOCSIS protocol with the registration server 52. The first SoC 14-1 can include the first processor device(s) 22-1 operable to implement the first RTOS 16-1 and the first MSS 18-1. For instance, in some implementations, the first SoC 14-1 and/or the first processor device(s) 22-1 can be a VIPER processor device and/or another suitable processor device.

The method includes, at block 202, initiating, by the second SoC 14-2 of the access device, the second MSS 18-2. The second MSS 18-2 can be operable to communicate with the registration server 52 and/or operable to communicate with the second LAN port 24-2 of the access device 12. The second SoC 14-2 can initiate the second RTOS 16-2 implementing the second MSS 18-2. Additionally, the second RTOS 16-2 can initiate the second DOCSIS driver 20-2 operable to communicate via a DOCSIS protocol with the registration server 52. The second SoC can include the second processor device(s) 22-2 operable to implement the second RTOS 16-2 and the second MSS 18-2. For instance, in some implementations, the second SoC 14-2 and/or the second processor device(s) 22-2 can be an ARM processor device and/or another suitable processor device.

The method includes, at block 204, registering the first MSS 18-1 as a first modem with the registration server 52 using a first MAC address. For instance, the first SoC 14-1 can communicate one or more registration message(s) to the registration server 52 (e.g., via the WAN interface 26, and/or the WANs 38) to request registration of the first MSS 18-1 as a modem serviced by the service provider network 50. For instance, the registration message(s) can include the first MAC address of the first MSS 18-1. The first MAC address can be associated with the first SoC 14-1 or dynamically provisioned to the first MSS 18-1. The registration server 52 can create and store a modem profile associating the first MAC address with the first MSS 18-1 and with other information such as customer, data speeds and/or bandwidth, associated services (e.g., voice services, television services, network services), and so on. In some implementations, the first MSS 18-1 can be or can include a first CMSS. Furthermore, in some implementations, registering the first MSS the first modem with the registration server 52 using the first MAC address can include registering the first CMSS as a first cable modem with the registration server 52 using the first MAC address.

The method includes, at block 206, registering the second MSS 18-2 as a second modem with the registration server 52 using a second MAC address. For instance, the second SoC 14-2 can communicate one or more registration message(s) to the registration server 52 (e.g., via the communications bridge 15, the first SoC 14-1, the WAN interface 26 and/or the wide-area network 38) to request registration of the second MSS 18-2 as a modem serviced by the service provider network 50. For instance, the registration message(s) can include the second MAC address of the second MSS 18-2. The second MAC address can be associated with the second SoC 14-2 or dynamically provisioned to the second MSS 18-2 (e.g., by the container 32 or container orchestration service 34). The registration server 52 can create and store a modem profile associating the second MAC address with the second MSS 18-2 and with other information such as customer, data speeds and/or bandwidth, associated services (e.g., voice services, television services, network services), and so on. In some implementations, the second MSS 18-2 can be or can include a second CMSS. Furthermore, in some implementations, registering the second MSS with the registration server 52 using the second MAC address can include registering the second CMSS as a second cable modem with the registration server 52 using the second MAC address.

The second SoC 14-2 and/or the second MSS 18-2 may communicate with the registration server 52 via the WAN interface 26 by first communicating via the first SoC 14-1. For instance, registering the first MSS 18-1 as the first modem with the registration server 52 using the first MAC address can include registering the first MSS 18-1 as the first modem with the registration server 52 using the first MAC address via the WAN interface 26 of the access device 12 and registering the second MSS 18-2 as the second modem with the registration server 52 using the second MAC address can include registering the second MSS 18-2 as the second modem with the registration server 52 using the second MAC address via the (e.g., same) WAN interface 26 of the access device 12. For instance, the first SoC 14-1 may be capable of directly communicating via the WAN interface 26 and the second SoC 14-2 may not be capable of directly communicating via the WAN interface 26 due to hardware limitations, system design (e.g., of a D4.0 cable modem), or other reasons. As one example, the first SoC 14-1 may be coupled to the WAN interface 26. The second SoC 14-2 may not be directly coupled to the WAN interface 26.

Each of the first MSS 18-1 and the second MSS 18-2 can communicate using IP addresses on the WAN interface 26. For instance, the first MSS 18-1 can obtain an IP address from the DHCP server 66 via the WAN interface 26, and the second MSS 18-2 can obtain a different IP address from the DHCP server 66 via the WAN interface 26. In some implementations the MSSs 18-1, 18-2 may each obtain both an IPV4 and an IPV6 address. In this manner, the first MSS 18-1 and the second MSS 18-2 can independently provide services on their respective local area networks 40-1 and 40-2.

Figure 3:
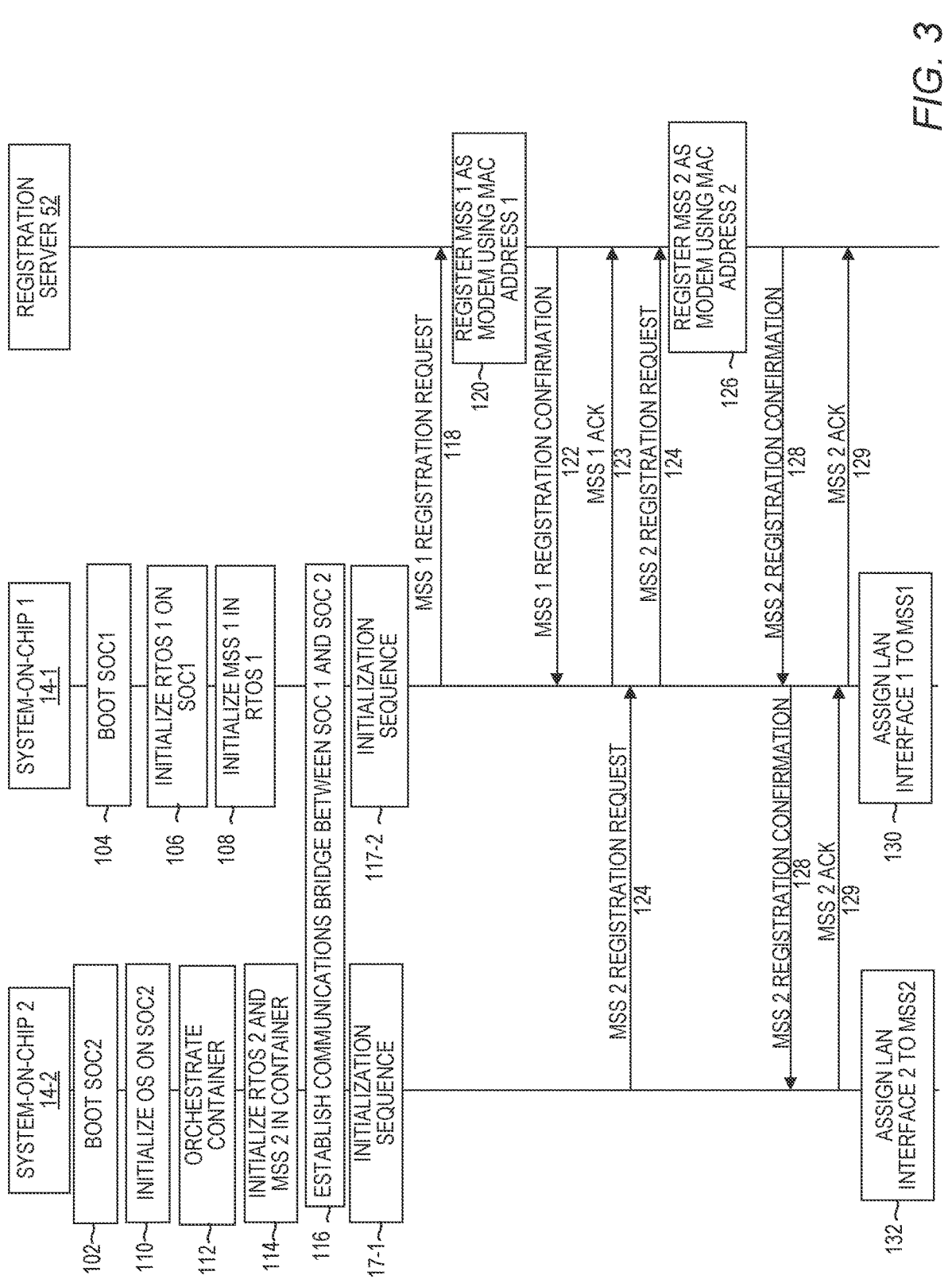
FIG. 3 is a sequence diagram illustrating operations and messages associated with various components in FIG. 1 to implement a first MSS and a second MSS in an access device according to some embodiments.

FIG. 3 is a sequence diagram illustrating operations and messages associated with various components in FIG. 1 to implement a first MSS and a second MSS in an access device according to some embodiments. The access device 12 can initiate a boot-up process using a service initialization manager (e.g., init.d) that boots the second SoC 14-2 (step 102) on the one or more processor device(s) 22-2. Once the second SoC 14-2 is booted, it can initiate a boot process to boot the first SoC 14-1 (step 104). In some implementations, the third SoC 14-3 (e.g., the security processor) can authenticate and/or decrypt boot code used to initialize the second SoC 14-2 and/or the first SoC 14-1 to implement a secure boot process.

The first SoC 14-1 can initialize the first RTOS 16-1 on the first SoC 14-1 (step 106). For instance, the first SoC 14-1 can boot or otherwise provision the first RTOS 16-1. The first SoC 14-1 can additionally initialize the first MSS 18-1 in the first RTOS 16-1 (step 108). In addition, the second SoC 14-2 can initialize the third OS 30 on the second SoC 14-2 (step 110). The second SoC 14-2 can orchestrate a container (e.g., by container orchestration service 34) or other virtual environment separate from the third OS 30 (step 112). The second SoC 14-2 can initialize the second RTOS 16-2 and the second MSS 18-2 in the container or virtual environment (step 114).

The second SoC 14-2 can establish the communications bridge 15 between the first SoC 14-1 and the second SoC 14-2 (step 116). Both the first MSS 18-1 and the second MSS 18-2 may perform various initialization processes, such as, by way of non-limiting example, initiating a downstream channel search and lock to locate valid downstream and upstream DOCSIS channels; initiating a DHCP exchange with the DHCP server 66 (FIG. 1) to obtain an IP address; initiating an exchange with the ToD server to obtain an accurate time of day to ensure over-all network timing accuracy; and initiating an exchange with a TFTP server to obtain the appropriate configuration file (steps 117-1-117-2). The configuration file may, for example, include the parameters the first MSS 18-1 and the second MSS 18-2 use to determine provisioned network access speeds, quality of service, advanced service features such as voice-over-IP, and the like for the LANs 40-1 and 40-2, respectively.

The first SoC 14-1 can communicate a registration request for the first MSS 18-1 to the registration server 52 (step 118). For instance, the registration request can include a first MAC address for the first MSS 18-1. The registration server 52 can, in response to the registration request, register the first MSS 18-1 as a modem using the first MAC address (step 120). The registration server 52 can communicate a registration confirmation message (e.g., a registration response OK message) for the first MSS 18-1 to the first SoC 14-1 (step 122). The registration confirmation message can include a Service Identifier (SID) for the first MSS 18-1. The first SoC 14-1 responds with an acknowledgement message indicating receipt of the registration confirmation message and indicating that the MSS 18-1 is now ready to transmit Internet data (step 123). Additionally or alternatively, the registration process can include registering the first DOCSIS driver 20-1 according to a DOCSIS registration process, such as the registration process specified by the DOCSIS 4.0 MAC and Upper Layer Protocols Interface (MULPI) Specifications.

The second SoC 14-2 can additionally communicate a registration request for the second MSS 18-2 across the communications bridge 15 to the first SoC 14-1. For instance, the registration request can include a second MAC address for the second MSS 18-2. The first SoC 14-1 can then forward the registration request for the second MSS 18-2 to the registration server 52 (step 124). The registration server 52 can register the second MSS 18-2 as a modem using the second MAC address (step 126). The registration server 52 can communicate a registration confirmation message for the second MSS 18-2 to the first SoC 14-1, which is then communicated to the second SoC 14-2 over the communications bridge 15 (step 128). Again, the registration confirmation message can include a Service Identifier (SID) for the second MSS 18-2. The second SoC 14-2 responds with an acknowledgement message indicating receipt of the registration confirmation message and indicating that the MSS 18-2 is now ready to transmit Internet data (steps 129). Finally, the first LAN interface 24-1 can be assigned to the first MSS 18-1 (step 130) and the second LAN interface 24-2 can be assigned to the second MSS 18-2 (step 132).

Figure 4:
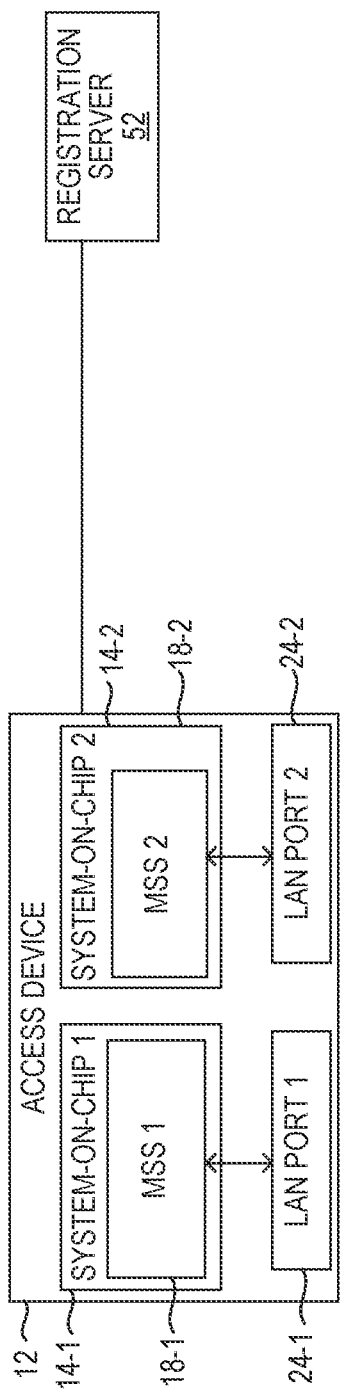
FIG. 4 is a block diagram of an environment including an access device having a first MSS and a second MSS according to some embodiments.

FIG. 4 is a block diagram of an environment including the access device 12 having the first MSS 18-1 and the second MSS 18-2 according to some embodiments. The access device 12 can initiate, by the first SoC 14-1 of the access device 12, the first MSS 18-1, which is operable to communicate with the registration server 52 and operable to communicate with the first LAN port 24-1 of the access device 12. The access device 12 can initiate, by the second SoC 14-2 of the access device 12, the second MSS 18-2, which is operable to communicate with the registration server 52 and operable to communicate with the second LAN port 24-2 of the access device 12. The access device 12 can register the first MSS 18-1 as a first modem with the registration server 52 using a first MAC address. The access device 12 can register the second MSS 18-2 as a second modem with the registration server 52 using a second MAC address.

Individuals will recognize improvements and modifications to the preferred examples of the disclosure. All such improvements and modifications are considered within the scope of the concepts disclosed herein and the claims that follow.

What is claimed is:

1. A method, comprising:

initiating, by a first system-on-chip (SoC) of an access device, a first modem software stack (MSS) operable to communicate with a registration server and operable to communicate with a first local area network (LAN) port of the access device;

initiating, by a second SoC of the access device, a second MSS operable to communicate with the registration server and operable to communicate with a second LAN port of the access device;

registering the first MSS as a first modem with the registration server using a first media access control (MAC) address; and registering the second MSS as a second modem with the registration server using a second MAC address.

2. The method of claim 1, wherein:

the first modem software stack comprises a first cable modem software stack (CMSS);

the second MSS comprises a second CMSS;

registering the first MSS as the first modem with the registration server using the first MAC address comprises registering the first CMSS as a first cable modem with the registration server using the first MAC address; and registering the second MSS as the second modem with the registration server using the second MAC address comprises registering the second CMSS as a second cable modem with the registration server using the second MAC address.

3. The method of claim 2, wherein the registration server comprises a cable modem termination system (CMTS).

4. The method of claim 1, wherein:

registering the first MSS as the first modem with the registration server using the first MAC address comprises registering the first MSS as the first modem with the registration server using the first MAC address via a wide-area network (WAN) interface of the access device; and registering the second MSS as the second modem with the registration server using the second MAC address comprises registering the second MSS as the second modem with the registration server using the second MAC address via the WAN interface of the access device.

5. The method of claim 4, further comprising:

obtaining, by the first MSS, a first IP address from a dynamic host configuration protocol (DHCP) server via the WAN interface; and obtaining, by the second MSS, a second IP address from the DHCP server via the WAN interface.

6. The method of claim 4, further comprising:

establishing a communications bridge between the first SoC and the second SoC of the access device, the communications bridge being operable to communicate messages between the first MSS and the second MSS.

7. The method of claim 6, wherein the first SoC is coupled to the WAN interface; and further comprising:

sending, by the second MSS to the first SoC via the communications bridge, a message to be communicated by the first SoC to the registration server via the WAN interface.

8. The method of claim 1, further comprising:

initiating, in the first SoC, a first real-time operating system (RTOS); and initiating, by the first RTOS, a first Data Over Cable Service Interface Specification (DOCSIS) driver operable to communicate via a DOCSIS protocol with the registration server.

9. The method of claim 8, further comprising:

initiating, in the second SoC, a second RTOS; and initiating, by the second RTOS, a second DOCSIS driver operable to communicate via the DOCSIS protocol with the registration server.

10. The method of claim 9, further comprising:

initiating, in the second SoC, a third operating system (OS) that is separate from the second RTOS.

11. The method of claim 10, further comprising:

initiating, by the third OS, a smart telemetry agent that is operable to obtain telemetry data associated with the first SoC and to obtain telemetry data associated with the second SoC; and streaming, by the smart telemetry agent, the telemetry data associated with the first SoC and the telemetry data associated with the second SoC to a server via a WAN interface of the access device.

12. The method of claim 10, wherein:

initiating, in the second SoC, the second RTOS comprises initiating the second RTOS in a first computing environment;

initiating, in the second SoC, the third OS that is separate from the second RTOS comprises initiating, in the second SoC, the third OS in a second computing environment; and further comprising:

causing, by the second SoC, the first computing environment to be associated with a first processor core of the second SoC; and causing, by the second SoC, the second computing environment to be associated with a second processor core of the second SoC.

13. The method of claim 9, wherein initiating, in the second SoC, the second RTOS further comprises one of:

initiating, in the second SoC, the second RTOS in a container by a container orchestration service; or initiating, in the second SoC, the second RTOS in a virtual machine.

14. The method of claim 1, wherein initiating, by a first system-on-chip (SoC) of an access device, a first modem software stack (MSS) comprises:

authenticating and decrypting boot code by a third SoC of the access device, the third SoC comprising a security processor; and initiating the first MSS using the boot code.

15. The method of claim 1, further comprising:

receiving, by the first MSS, provisioning information from the registration server that identifies a first subscribed service for the first MSS; and receiving, by the second MSS, provisioning information from the registration server that identifies a second subscribed service for the second MSS.

16. An access device, comprising:

a first system-on-chip (SoC);

a second SoC;

wherein the first SoC is operable to initiate a first modem software stack (MSS) that is operable to communicate with a registration server and that is operable to communicate with a first local area network (LAN) port of the access device;

wherein the second SoC is operable to initiate a second MSS that is operable to communicate with the registration server and that is operable to communicate with a second LAN port of the access device;

register the first MSS as a first modem with the registration server using a first media access control (MAC) address; and register the second MSS as a second modem with the registration server using a second MAC address.

17. The access device of claim 16, wherein:

the first MSS comprises a first cable modem software stack (CMSS);

the second MSS comprises a second CMSS;

registering the first MSS as the first modem with the registration server using the first MAC address comprises registering the first CMSS as a first cable modem with the registration server using the first MAC address; and registering the second MSS as the second modem with the registration server using the second MAC address comprises registering the second CMSS as a second cable modem with the registration server using the second MAC address.

18. The access device of claim 16, wherein:

registering the first MSS as the first modem with the registration server using the first MAC address comprises registering the first MSS as the first modem with the registration server using the first MAC address via a wide-area network (WAN) interface of the access device; and registering the second MSS as the second modem with the registration server using the second MAC address comprises registering the second MSS as the second modem with the registration server using the second MAC address via the WAN interface of the access device.

19. The access device of claim 16, further comprising:

initiating, in the first SoC, a first embedded configurable operating system (RTOS);

initiating, by the first RTOS, a first Data Over Cable Service Interface Specification (DOCSIS) driver operable to communicate via a DOCSIS protocol with the registration server;

initiating, in the second SoC, a second RTOS; and initiating, by the second RTOS, a second DOCSIS driver operable to communicate via the DOCSIS protocol with the registration server.

20. A non-transitory computer-readable storage medium that includes executable instructions operable to cause a processor device to:

initiate, by a first system-on-chip (SoC) of an access device, a first modem software stack (MSS) operable to communicate with a registration server and operable to communicate with a first local area network (LAN) port of the access device;

initiate, by a second SoC of the access device, a second MSS operable to communicate with the registration server and operable to communicate with a second LAN port of the access device;

register the first MSS as a first modem with the registration server using a first media access control (MAC) address; and register the second MSS as a second modem with the registration server using a second MAC address.

* * * * *